United States Patent
Wu et al.

(10) Patent No.: US 11,984,927 B2
(45) Date of Patent: May 14, 2024

(54) BAND-PASS CONCENTRATOR FOR VISIBLE LIGHT COMMUNICATIONS SYSTEM AND VISIBLE LIGHT COMMUNICATIONS SYSTEM

(71) Applicant: SOOCHOW UNIVERSITY, Suzhou (CN)

(72) Inventors: Shaolong Wu, Suzhou (CN); Jizhou Zhuang, Suzhou (CN); Jiayu Lu, Suzhou (CN); Huilin Ni, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 12 days.

(21) Appl. No.: 17/802,554

(22) PCT Filed: Nov. 29, 2021

(86) PCT No.: PCT/CN2021/134185
§ 371 (c)(1),
(2) Date: Aug. 26, 2022

(87) PCT Pub. No.: WO2023/040053
PCT Pub. Date: Mar. 23, 2023

(65) Prior Publication Data
US 2023/0308181 A1  Sep. 28, 2023

(30) Foreign Application Priority Data
Sep. 14, 2021  (CN) .......................... 202111074527.5

(51) Int. Cl.
*H04B 10/116*  (2013.01)
*G02B 19/00*  (2006.01)

(52) U.S. Cl.
CPC ....... *H04B 10/116* (2013.01); *G02B 19/0009* (2013.01)

(58) Field of Classification Search
None
See application file for complete search history.

(56) References Cited

U.S. PATENT DOCUMENTS 4,042,821 A * 8/1977 Mierzwinski ...... G02B 19/0028
359/710
4,907,864 A * 3/1990 Hagerty .................. C03B 19/09
359/653

(Continued)

FOREIGN PATENT DOCUMENTS

| CN | 106850062 A | 6/2017 |
| WO | 2014066957 A1 | 5/2014 |

*Primary Examiner* — Darren E Wolf
(74) *Attorney, Agent, or Firm* — SZDC Law PC

(57) ABSTRACT

This application discloses a band-pass concentrator (BPC) for visible light communications (VLC) and a VLC system. The BPC includes a housing. A cavity is disposed in the housing, and the cavity is filled with a dielectric. A light entrance that presents a concave spherical surface and that is recessed towards the cavity is disposed on a side of the housing, a light exit is disposed on a side of the housing that is opposite to the light entrance, and a side of the light exit that is away from the cavity is configured with dielectric multilayers that has a filtering function. Compared with a conventional CPC, the BPC implement the larger field of view, higher optical gain, reduced mass, and filtering function. The VLC system using the as-proposed BPC clearly increase the communications distance, bandwidth, and receiving field of view, and reduce the overall complexity and costs.

9 Claims, 3 Drawing Sheets

(56) References Cited

U.S. PATENT DOCUMENTS 4,962,311 A * 10/1990 Poisel .................. G01J 1/0422
356/141.5
5,023,440 A * 6/1991 Kuppenheimer, Jr. .....................
G01S 3/786
356/141.5
5,357,101 A 10/1994 Plesko

* cited by examiner

BAND-PASS CONCENTRATOR FOR VISIBLE LIGHT COMMUNICATIONS SYSTEM AND VISIBLE LIGHT COMMUNICATIONS SYSTEM

This application is the National Stage Application of PCT/CN2021/134185, filed on Nov. 29, 2021, which claims priority to Chinese Patent Application No. 202111074527.5, filed on Sep. 14, 2021, which is incorporated by reference for all purposes as if fully set forth herein.

TECHNICAL FIELD

This application relates to the optical antenna field, mainly, to a band-pass concentrator with a filtering function for a visible light communications system and a visible light communications system.

BACKGROUND

Visible light communications technology, as a new communications technology, usually takes a light-emitting diode (LED) as a signal transmitting end and a photoelectric detector as a signal receiving end. The visible light communications technology has advantages such as rich spectrum resources, no electromagnetic radiation, high security, and energy saving, and has two major functions: communication and illumination. Because a visible light intensity attenuates with an increase of a propagation distance, a communications distance of a visible light communications system is usually greatly limited. To meet a requirement in practical application, the signal receiving end is required to have a specific receiving field of view, so that a communications link is not limited to point-to-point communication. To meet the foregoing two requirements, a concentrator usually needs to be added to the front of the photoelectric detector, so as to maintain a large field of view when an optical gain is implemented.

For a fluorescent LED, blue light firstly excites yellow phosphor, and then the blue light and yellow light are mixed, resulting in white light. Because a response speed of a yellow component is slow, the yellow-light component is usually filtered out at the receiving end during visible light communications for the larger modulation bandwidth of a white light LED. However, for a white light device (for example, an RGB LED) formed through a mixture of multiple monochromatic colors, an independent communications channel is separated through a wavelength division multiplexing technology, that is, by using specific wavelength features of different monochromatic light, so that a modulation bandwidth and a communications rate of the system can be greatly increased. To avoid mutual interference between channels, optical filters of different band-passes are usually added to the front of photoelectric detectors of the channels, or the detectors are directly designed to have wavelength-selective responses.

Therefore, complexity of the system is increased, or stringent requirements are imposed on the photoelectric detectors.

A compound parabolic concentrator (CPC) is a non-imaging concentrator designed according to principles of geometrical optics, and is obtained by two symmetric parabolas rotating about a central axis. Theoretically, the CPC can reflect all light with an incidence angle less than an acceptance angle of the CPC to the rear surface. Compared with a conventional lens concentrator, the CPC has both a larger field of view and a larger light concentration ratio.

SUMMARY

To solve problems of a short communications distance and poor communications quality in visible light communications, this application is intended to provide a band-pass concentrator for a visible light communications system, to implement an optical gain, an enlarged field of view, and an optical filtering function.

To achieve the foregoing objective, the following technical solutions are used in this application:

A band-pass concentrator for visible light communications includes a housing. A cavity is disposed in the housing, and the cavity is filled with a dielectric. A light entrance that presents a concave spherical surface and that is recessed towards the cavity is disposed on a side of the housing, a light exit is disposed on a side of the housing that is opposite to the light entrance, and a side of the light exit that is away from the cavity is configured with a multilayer dielectric film that has a filtering function.

Preferably, the housing is U-shaped, and the multilayer dielectric film is connected to a photoelectric detector.

Preferably, the light exit is configured as a flat surface on which a multilayer dielectric film structure is disposed, the multilayer dielectric film structure is used as a connective dielectric between the band-pass concentrator and a photoelectric detector, and the multilayer dielectric film structure is used for filtering, so that the detector makes a photoelectric response only to light of a target wavelength.

Preferably, the dielectric is at least one of a BK7 material, quartz glass, or polymethyl methacrylate (PMMA), or a combination thereof.

Preferably, an effective incidence angle of the band-pass concentrator for visible light communications is in the range of 60°-89°.

Preferably, the multilayer dielectric film includes high refractive index layers and low refractive index layers that are alternately stacked.

Preferably, each of the high refractive index layers includes a $TiO_2$ material.

Preferably, each of the low refractive index layers includes: a $MgF_2$ material or a $SiO_2$ material.

Preferably, the light entrance is larger than the light exit, and a ratio of the light entrance L1 to the light exit L2 is from 1.2 to 5.0.

This application provides a visible light communications system that includes the forgoing band-pass concentrator for visible light communications.

BENEFICIAL EFFECTS

Compared with a conventional CPC, a band-pass concentrator for a visible light communications system in the implementations of this application can obtain a larger field of view, that is, the band-pass concentrator can double an optical gain or implement a higher optical gain, thereby significantly improving a communications effect of the visible light communications system. The entire mass can be significantly reduced without increasing a spatial volume of an optical antenna, and a filtering function can be further implemented. The visible light communications system using the concentrator in the solutions can clearly increase a communications distance, a bandwidth, and a receiving field of view of a single photoelectric detector of the system, and can reduce both overall complexity and costs of the system.

DESCRIPTION OF EMBODIMENTS

Figure 1:
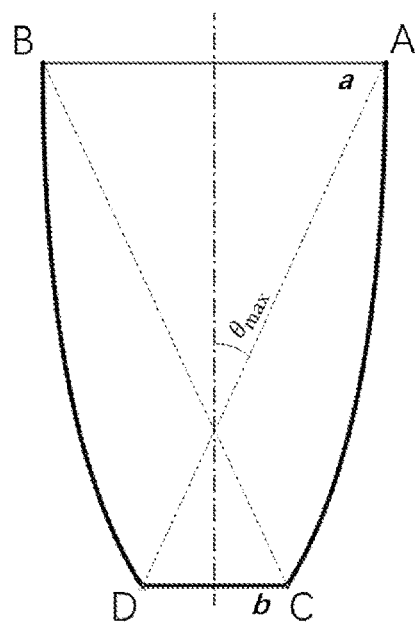
FIG. 1 is a schematic diagram of a center section of a conventional CPC, where D and C are respectively focal points of parabolas AC and BD, a and b are respectively diameters of a light entrance and a light exit of the CPC, and a half of an included angle $\theta_{max}$ between AD and BC is a largest half acceptance angle (namely, a half field of view)

The following further describes the foregoing solutions with reference to specific embodiments. It should be understood that these embodiments are used to describe this application and are not intended to limit the scope of this application. Implementation conditions used in the embodiments may be further adjusted according to conditions of a specific manufacturer, and implementation conditions not specified are usually those used in conventional experiments.

This application discloses a band-pass concentrator for visible light communications. The band-pass concentrator includes a housing. A cavity is disposed in the housing, and the cavity is filled with a dielectric. A light entrance that presents a concave spherical surface and that is recessed towards the cavity is disposed on a side of the housing, a light exit is disposed on a side of the housing that is opposite to the light entrance, and a side of the light exit that is away from the cavity is configured with a multilayer dielectric film that has a filtering function. Compared with a conventional CPC, the band-pass concentrator can obtain a larger field of view. To be specific, in a larger incidence angle range, the band-pass concentrator can double an optical gain or implement a higher optical gain, thereby significantly improving a communications effect of the visible light communications system. The entire mass can be significantly reduced without increasing a spatial volume of an optical antenna, and a filtering function can be further implemented. The visible light communications system using the concentrator in the solutions can clearly increase a communications distance, a bandwidth, and a receiving field of view of a single photoelectric detector of the system, and can reduce both overall complexity and costs of the system. The band-pass concentrator can double an optical gain in a wide incidence angle range. After the concentrator is used in the visible light communications system, that is, the concentrator is mounted above the photoelectric detector, the concentrator can increase strength of a received signal at normal incidence, and ensure that the communications system operates normally even at oblique incidence at a large angle. Different from a concave design of a light entrance in conventional thinking, the concentrator in this application can further greatly reduce the mass of a filled CPC, save a filling material, and reduce overall costs. In addition, because a multilayer film system is disposed at the light exit of the concentrator, interfering signal light can be further filtered out, and light communications quality can be improved. The whole visible light communications system can be simplified without requiring an additional light filtering system. The concentrator is designed specially for receiving in a wide field of view in visible light communications of an indoor white light LED. To ensure signal strength, it is expected that the concentrator does not cause obvious attenuation to incident light at a large incidence angle, that is, it can be ensured that an optical gain is not less than 1 at a large incidence angle.

The following describes the band-pass concentrator for a visible light communications system provided in this application with reference to the accompanying drawings.

As shown in FIG. 1, a conventional CPC (compound paraboloid concentrator) is obtained by rotating two symmetric parabolas AC and BD about a central axis.

When an incidence angle of incident light is less than or equal to $\theta_{max}$, theoretically, all light can directly reach or can be reflected and then reach the exit of the concentrator; or when an incidence angle of the light is greater than $\theta_{max}$, the light is reflected multiple times and is finally emitted from the entrance of the CPC. In this case, a gain of the concentrator is 0. A geometrical light concentration ratio of the conventional CPC is $$C_g = \frac{a}{b} = \frac{1}{\theta_{max}}.$$

Figure 2:
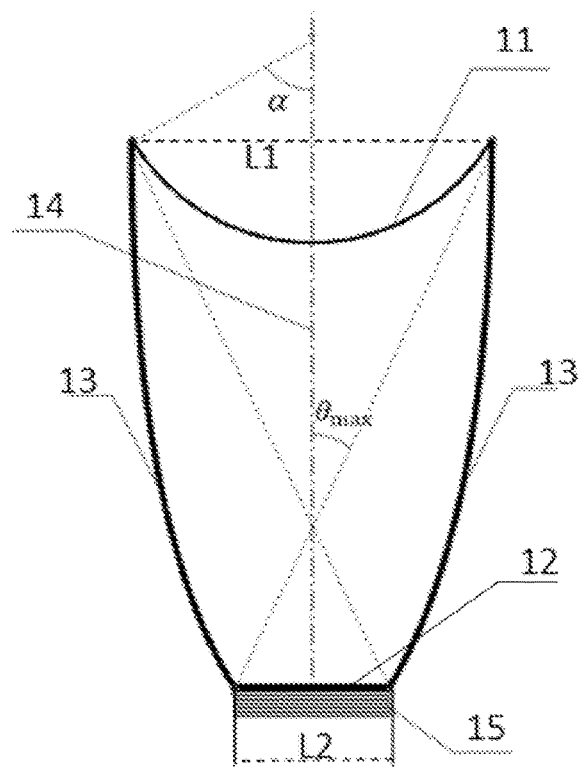
FIG. 2 is a schematic diagram of a center section of a band-pass concentrator for a visible light communications system according to an embodiment of this application.

Therefore, the applicant improves the conventional CPC to form a band-pass concentrator (shown in FIG. 2).

The band-pass concentrator for a visible light communications system includes:

a housing 13.

A light entrance 11 that presents a concave spherical surface and that is recessed towards the cavity is disposed on a side of the housing.

A light exit 12 is disposed on a side of the housing that is opposite to the light entrance.

The housing is filled with a dielectric 14.

The light entrance has a shape of a concave spherical surface, and a half central angle of the concave spherical surface is $\alpha$.

A multilayer dielectric film 15 is disposed on an outer side of the light exit.

The housing is configured as a parabolic highly-refractive surface layer. A largest half acceptance angle of a CPC that is not filled with a dielectric (that is, the conventional CPC) is $\theta_{max}$.

The original hollowed concentrator is filled with the dielectric through an structural improvement. In addition, an upper surface of the filled dielectric is designed as a concave spherical surface, which is also used as the light entrance of the concentrator. A half central angle of an arc in a cross-sectional view of the light entrance is α. With such a design, a field of view of the detector can be significantly increased. In this implementation, compared with a filled CPC whose light entrance is designed as a convex spherical surface, the CPC whose light entrance is designed as a concave spherical surface can significantly reduce the mass of the concentrator. In this implementation, the light exit (also referred to as a light outlet) of the concentrator is configured as a flat surface. A multilayer dielectric film structure is disposed on the flat surface, and the multilayer dielectric film structure may be used as a connective dielectric between the concentrator and the photoelectric detector. The multilayer dielectric film structure has a filtering function, so that the detector makes a photoelectric response only to light of a target wavelength. A dielectric with a high refractive index used in the multilayer film structure is $TiO_2$, and a material with a low refractive index used therein is $MgF_2$ or $SiO_2$. A specific thickness, quantity of layers, and combination thereof are determined by a center wavelength of a target bandpass. A filling dielectric with a specific morphologic feature is directly formed by processing a bulk material (or a block material) (instead of obtaining an unfilled conventional CPC before filling the filling dielectric). A conventional method for increasing the field of view of the CPC is to dispose a convex spherical surface or a fish-eye lens at a light entrance of the conventional CPC. Although this method can increase the field of view, a spatial volume and the entire mass of the whole concentrator are significantly increased compared with those of the conventional CPC and a planar filling-based CPC due to introduction of a convex filler. The solution provided in this application uses a method different from that in the conventional thinking. To be specific, compared with the planar filling-based CPC, the CPC using the concave filling manner not only can implement a larger effective field of view, but also can significantly reduce the entire mass of the concentrator without increasing the spatial volume of the concentrator.

In this implementation, a body of the housing is U-shaped, and the light entrance at the top of the housing is larger than the light exit at the bottom of the housing. A specific ratio of the light entrance L1 to the light exit L2 is in the range of 1.2-5.0. Further, a ratio of the light entrance L1 to the light exit L2 is in the range of 2.0-3.5. With such a design, an optical gain of the concentrator can be further increased.

In this implementation, the upper surface of the filling dielectric is designed as a concave spherical surface, to resolve a problem that a gain of the conventional CPC is 0 when an incidence angle of the conventional CPC is greater than the largest half acceptance angle thereof. According to the law of refraction, the filling dielectric can reduce the incidence angle of the incident light before the incident light is reflected by the CPC, thereby increasing the field of view of the concentrator. In this case, changing the upper surface of the filling dielectric from a flat surface to a curved surface can reduce the incidence angle of the incident light to a different extent. Therefore, an incidence angle of partial incident light can be reduced to a greater extent, thereby further increasing the field of view of the concentrator.

Next, simulation is performed by using the Tracepro software to verify the concave filling-based CPC provided in this application.

Figure 3:
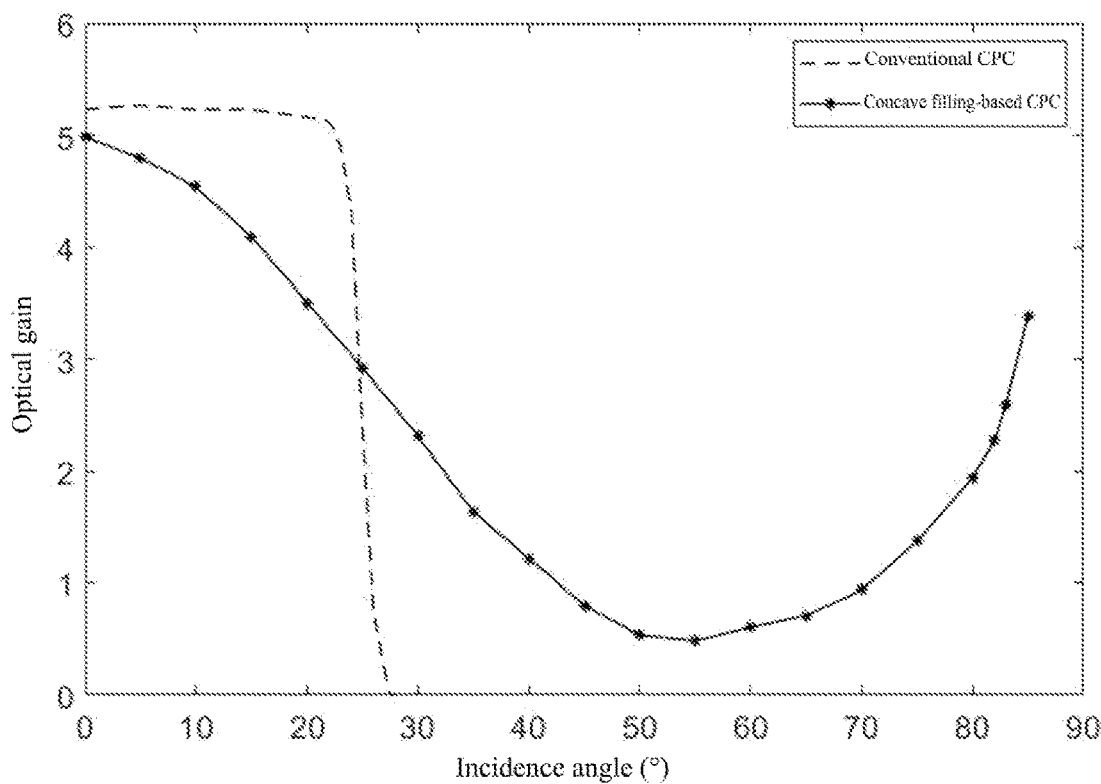
FIG. 3 is a curve graph of a relationship between an optical gain and an incidence angle for each of a concave filling-based CPC and a conventional CPC according to an embodiment of this application.

A specific effect is shown in FIG. 3, and optical gains of incident light at different incidence angles are obtained.

In an example of a concave filling-based CPC with $\theta_{max}$ being 25°, a being 60°, and a filling dielectric being BK7, when an incidence angle is less than $\theta_{max}$, an optical gain of the concave filling-based CPC is slightly less than that of the conventional CPC. However, when the incidence angle is greater than $\theta_{max}$, the optical gain of the concave filling-based CPC does not rapidly attenuate to 0 as that of the conventional CPC. Instead, the concave filling-based CPC can still maintain a considerable optical gain. In this implementation, the dielectric is BK7 optical glass. In other implementations, the dielectric is quartz glass, polymethyl methacrylate (PMMA), or a combination thereof.

Therefore, the applicant further compares and studies effective incidence angle ranges of the concentrator provided in this application and the conventional concentrator in cases of different $\theta_{max}$ and α.

FIG. 3 is used as an example (corresponding $\theta_{max}$ is 25°, a is 60°, and the filling dielectric is BK7). When the incidence angle is less than 42.5° and greater than 70.6°, the optical gain is greater than 1, and when the incidence angle is from 42.5° to 70.6°, the optical gain is less than 1. Therefore, the effective incidence angle range can be calculated as follows: 42.5°+(90°-70.6°)=61.9°.

In addition, the applicant further compares and studies effective incidence angle ranges of the concentrator provided in this application, the conventional concentrator, and a filled CPC whose light entrance surface is designed as a concave spherical surface in cases of different $\theta_{max}$ and α. For specific results, refer to Table 1 and FIG. 4.

Figure 4:
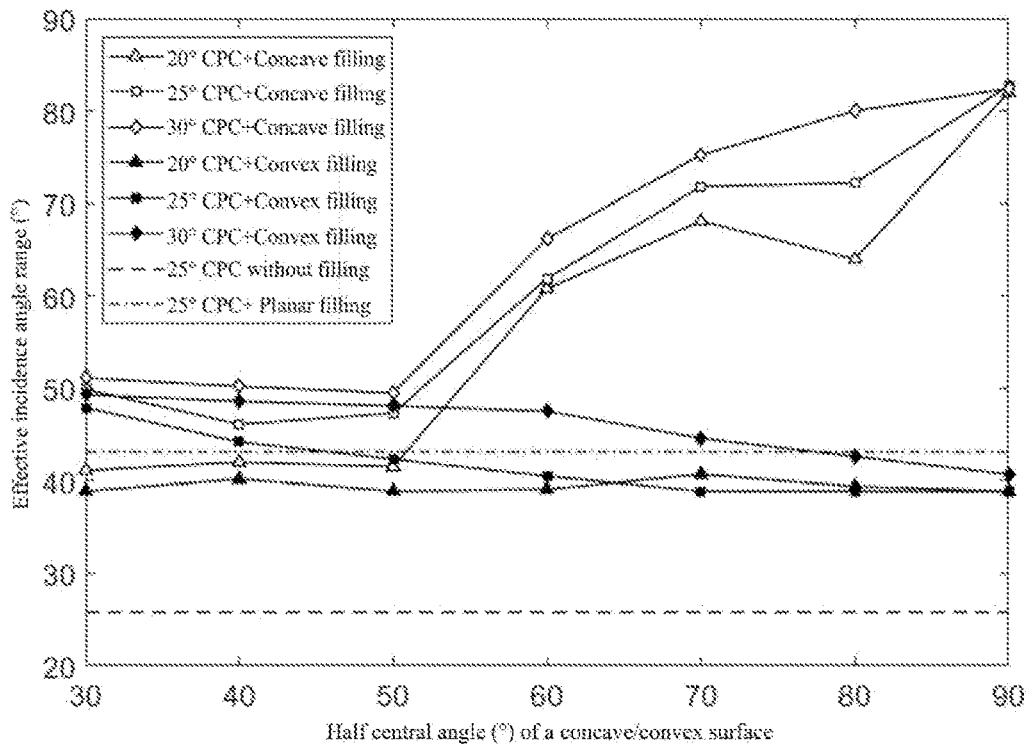
FIG. 4 is a curve graph of a relationship between an effective incidence angle range and a half central angle for each of a concave filling-based CPC, a convex filling-based CPC, a conventional CPC, and a planar filling-based CPC according to an embodiment of this application.

It can be seen from Table 1 and FIG. 4 that, in case of any $\theta_{max}$ and α, the concave filling-based CPC provided in this application has a significantly larger effective incidence angle range.

Compared with the conventional CPC, both the concave filling-based CPC and the convex filling-based CPC have a significantly increased effective incidence angle range.

However, as α increases, the overall effective incidence angle range of the convex filling-based CPC is reduced. When $\theta_{max}$ is greater than or equal to 25°, a corresponding effective incidence angle range is less than that of the planar filling-based CPC. In sharp contrast, as α increases, the overall effective incidence angle range of the concave filling-based CPC is significantly increased, and is significantly greater than that of the planar filling-based CPC.

TABLE 1

A comparison between the effective incidence angle range of the conventional CPC and those of the three types of CPCs based on different filling manners.

| | $\theta_{max}$ = 20° | | $\theta_{max}$ = 25° | | $\theta_{max}$ = 30° | |
|---|---|---|---|---|---|---|
| | Concave surface | Convex surface | Concave surface | Convex surface | Concave surface | Convex surface |
| α = 30° | 41.1° | 38.9° | 49.9° | 47.9° | 51.1° | 49.3° |
| α = 40° | 42.0° | 40.2° | 46.1° | 44.2° | 50.2° | 48.6° |
| α = 50° | 41.5° | 38.9° | 47.3° | 42.3° | 49.5° | 48.1° |
| α = 60° | 60.8° | 39.1° | 61.9° | 40.5° | 66.2° | 47.5° |
| α = 70° | 68.1° | 40.7° | 71.8° | 38.9° | 75.2° | 44.6° |
| α = 80° | 64.0° | 39.4° | 72.2° | 38.9° | 80.0° | 42.6° |
| α = 90° | 82.0° | 38.9° | 82.7° | 38.9° | 82.4° | 40.7° |
| Planar filling-based CPC | 34.3° | | 43.1° | | 51.1° | |
| Conventional CPC | 21.0° | | 25.8° | | 30.6° | |

In addition, the concave filling manner has smaller overall mass than those of the convex filling and the planar filling, thereby saving consumables.

Figure 5:
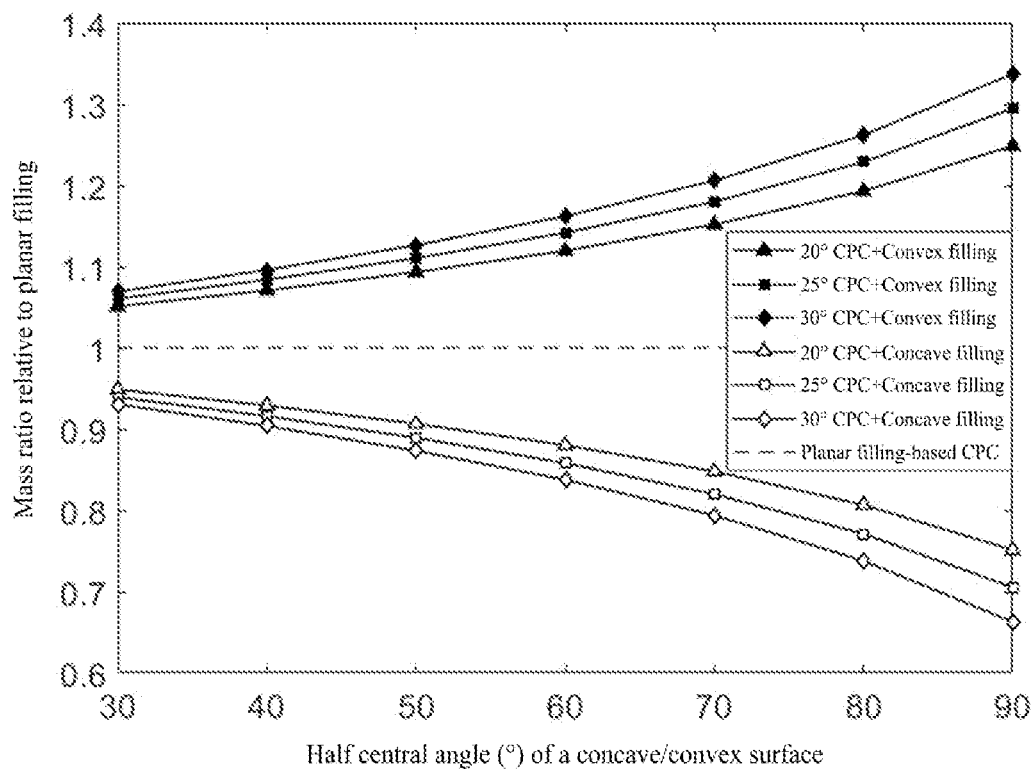
FIG. 5 is a curve graph of a relationship between a mass ratio relative to planar filling and a different half central angle for each of a concave filling-based CPC and a convex filling-based CPC according to an embodiment of this application.

With the mass of the planar filling-based CPC as a reference, a result of comparison between the concave filling and the convex filling is shown in FIG. 5. It can be seen that, as $\alpha$ and $\theta_{max}$ increase, the entire mass of the concave filling-based CPC continuously decreases, and the entire mass of the convex filling-based CPC continuously increases. For a CPC whose $\theta_{max}$ is 25°, when $\alpha$ is greater than 70°, the mass of the concave filling-based CPC can be reduced by 20% or above compared with that of the planar filling-based CPC.

Further, the multilayer dielectric film is disposed at the light exit of the band-pass concentrator (the concave filling-based concentrator) for the visible light communications system, and the multilayer dielectric film can be configured to filter out interfering light that carries no signal, and facilitates a seamless connection between the concentrator and the back-end photoelectric detector. The multilayer dielectric film includes high refractive index layers and low refractive index layers that are alternately configured. In an example of designing a band-pass film system with a center wavelength of 450 nm, $TiO_2$ is selected as the high refractive index layers, and $MgF_2$ is selected as the low refractive index layers. Four pairs of $TiO_2$ and $MgF_2$ high and low refractive index films are sequentially and alternately deposited by using the light exit of the concave filling-based concentrator as a substrate. The four pairs of $TiO_2$ and $MgF_2$ high and low refractive index films respectively have thicknesses of 22.0 nm, 75.8 nm, 82.8 nm, 90 nm, 49.1 nm, 112.2 nm, 71.4 nm, and 406.9 nm.

Figure 6:
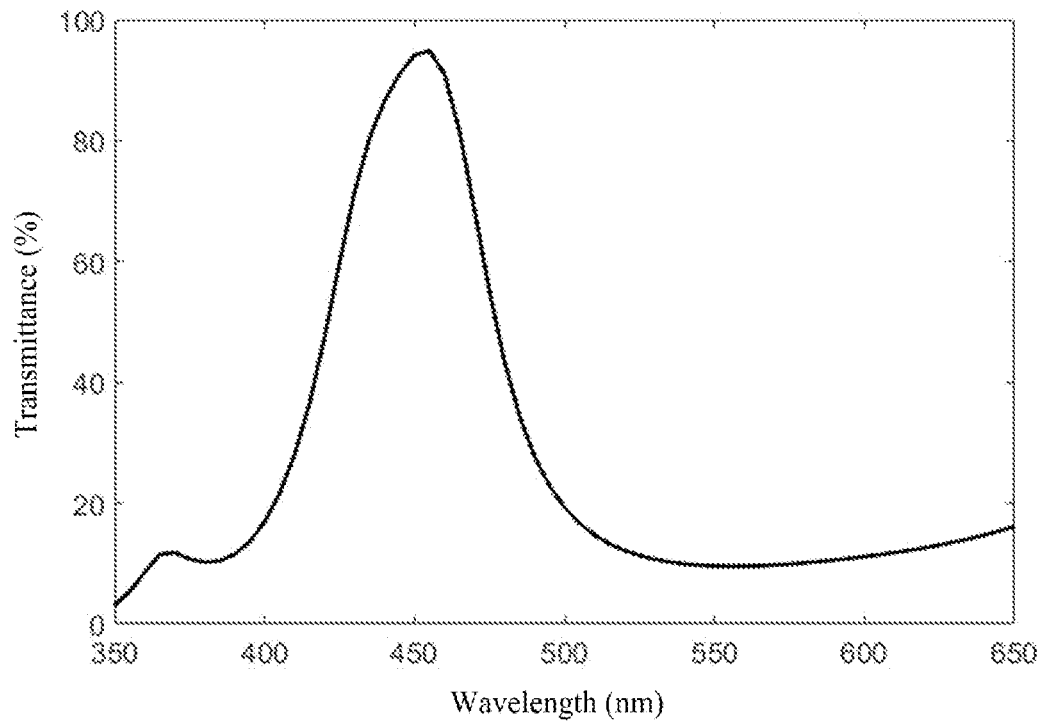
FIG. 6 is a transmission spectrogram of a band-pass concentrator for a visible light communications system according to an embodiment of this application.

With the multilayer film structure, a transmission spectrum of the incident light is shown in FIG. 6. Only a transmittance of incident light at 450 nm can reach 40% or above, and a transmittance of incident light with the center wavelength can reach 95%. Transmittances of yellow light with a wavelength of 500 nm, green light with a wavelength of 550 nm, and red light with a wavelength of 620 nm each are 20% or below. For a white light source formed by an RGB LED, when modulation is performed by using a wavelength division multiplexing technology, a band-pass film system can be separately designed into multilayer film structures whose center wavelengths are respectively 620 nm, 550 nm, and 450 nm. The band-pass film system is disposed between the light exit of the concave filling-based CPC and the front surface of the photoelectric detector.

This application further provides a visible light communications system, which includes the foregoing band-pass concentrator for visible light communications. The band-pass concentrator is designed specially for receiving in a wide field of view of an indoor white light LED in visible light communications.

A multilayer film structure is disposed at a light exit of the band-pass concentrator (also referred to as a concave filling-based CPC) for visible light communications provided in this application. The multilayer film structure can implement a seamless connection between the concentrator and a back-end photoelectric detector, and can further filter out interfering light, thereby effectively increasing a modulation bandwidth and a communications rate of the system. However, in a conventional visible light communications system, two discrete optical elements (namely, a filter and a concentrator) are required to implement this function. The visible light communications system using the proposed concentrator in this application can apparently increase a communications distance, a bandwidth, and a receiving field of view of a single photoelectric detector of the system, and can reduce overall complexity and costs of the system. The field of view of the concentrator designed in the present invention is determined by a half central angle that is formed by a concave filling-based curved surface. An effective incidence angle or a half acceptance angle can reach 60° or above. However, a field of view of a conventional CPC is determined by $\theta_{max}$, and a half acceptance angle is only in hen rang of 20°-30°. Using parallel light as an example, when the incidence angle increases to a largest half acceptance angle of the CPC, an optical gain of the parallel light rapidly attenuates to 0. However, the concave filling-based CPC can still maintain a considerable optical gain. In conclusion, compared with the conventional CPC and convex filling-based CPC, the concave filling-based CPC in this solution can implement a larger effective field of view, and can significantly reduce the entire mass without increasing a spatial volume of an optical antenna, while implementing a filtering function.

The foregoing embodiments are merely used to describe technical concepts and features of this application, and are intended to enable a person skilled in the art to understand content of this application and implements the content based on such understanding, but are not intended to limit the protection scope of this application. Any equivalent transformation or modification made within the spirit or essence of this application shall fall within the protection scope of this application.

What is claimed is:

1. A band-pass concentrator for visible light communications, comprising:
    a housing, wherein
    a cavity is disposed in the housing, and the cavity is filled with a dielectric;
    a light entrance that presents a concave spherical surface and that is recessed towards the cavity is disposed on a side of the housing; and
    a light exit is disposed on a side of the housing that is opposite to the light entrance, a side of the light exit that is away from the cavity is configured with a multilayer dielectric film that has a filtering function, and a half central angle of the concave spherical surface is from 60° to 90°.

2. The band-pass concentrator for visible light communications according to claim 1, wherein
    the housing is U-shaped, and the multilayer dielectric film is connected to a photoelectric detector.

3. The band-pass concentrator for visible light communications according to claim 1, wherein
    the light exit is configured as a flat surface on which the multilayer dielectric film is disposed, the multilayer dielectric film is used as a connective dielectric between the band-pass concentrator and a photoelectric detector, and the multilayer dielectric film is used for filtering, so that the detector makes a photoelectric response only to light of a target wavelength.

4. The band-pass concentrator for visible light communications according to claim 1, wherein
    the dielectric is at least one of a BK7 material, quartz glass, or polymethyl methacrylate, or a combination thereof.

5. The band-pass concentrator for visible light communications according to claim 1, wherein
    an effective incidence angle of the band-pass concentrator for visible light communications is in the range of 60°-89°.

6. The band-pass concentrator for visible light communications according to claim 1, wherein the multilayer dielectric film comprises high refractive index layers and low refractive index layers that are alternately stacked.

7. The band-pass concentrator for visible light communications according to claim 6, wherein
each of the high refractive index layers comprises a $TiO_2$ material.

8. The band-pass concentrator for visible light communications according to claim 6, wherein
each of the low refractive index layers comprises: a $MgF_2$ material or a $SiO_2$ material.

9. The band-pass concentrator for visible light communications according to claim 6, wherein
the light entrance is larger than the light exit, and a ratio of the light entrance L1 to the light exit L2 is in the range of 1.2-5.0.

\* \* \* \* \*